(12) United States Patent
Norieda et al.

(10) Patent No.: US 8,848,338 B2
(45) Date of Patent: Sep. 30, 2014

(54) ELECTRIC DOUBLE LAYER CAPACITOR

(75) Inventors: Hiroyuki Norieda, Tokyo (JP); Kotaro Kobayashi, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 1309 days.

(21) Appl. No.: 12/438,235

(22) PCT Filed: Aug. 30, 2007

(86) PCT No.: PCT/JP2007/067355
§ 371 (c)(1),
(2), (4) Date: May 4, 2010

(87) PCT Pub. No.: WO2008/029865
PCT Pub. Date: Mar. 13, 2008

(65) Prior Publication Data
US 2010/0220429 A1 Sep. 2, 2010

(30) Foreign Application Priority Data
Sep. 1, 2006 (JP) .................................. 2006-237562

(51) Int. Cl.
*H01G 9/00* (2006.01)
*H01G 11/32* (2013.01)
*H01G 11/42* (2013.01)
*H01G 11/24* (2013.01)
*H01G 9/022* (2006.01)

(52) U.S. Cl.
CPC ............... *H01G 11/24* (2013.01); *H01G 11/32* (2013.01); *H01G 11/42* (2013.01); *Y02T 10/7022* (2013.01); *H01G 9/038* (2013.01); *Y02E 60/13* (2013.01)
USPC ......................................................... 361/502

(58) Field of Classification Search
USPC ......................................................... 361/502
See application file for complete search history.

(56) References Cited

U.S. PATENT DOCUMENTS 5,862,035 A * 1/1999 Farahmandi et al. ......... 361/502
5,953,204 A 9/1999 Suhara et al. .................. 361/502
(Continued)

FOREIGN PATENT DOCUMENTS

JP  1-227417  9/1989
JP  7-99141  4/1995
(Continued)

OTHER PUBLICATIONS

Machine translation with human transition of table 1 of JP2001146410A published May 29, 2001.*
(Continued)

*Primary Examiner* — David M Sinclair
(74) *Attorney, Agent, or Firm* — Allan M. Wheatcraft

(57) ABSTRACT

Disclosed is an electric double layer capacitor comprising a polarizable electrode layer that contains an activated carbon, a conductive agent, and a binder, wherein an external specific surface area of the activated carbon (defined as a specific surface area calculated from a nitrogen absorption isotherm by a t-plot method by excluding micropores of pore diameter smaller than 20 angstroms), per unit volume of the polarizable electrode layer, lies within a range of 450 to 800 m²/cm³, and a volume based on inter-particle interstices per unit volume of the polarizable electrode layer lies within a range of 0.05 to 0.12 cm³/cm³. The electric double layer capacitor according to the present invention is particularly suited to large current, quick discharge applications.

10 Claims, 2 Drawing Sheets

(56) References Cited

U.S. PATENT DOCUMENTS

| | | | |
|---|---|---|---|
| 5,956,225 A | 9/1999 | Okuyama et al. | 361/502 |
| 6,865,068 B1 | 3/2005 | Murakami et al. | |
| 7,283,349 B2 * | 10/2007 | Yoshida et al. | 361/502 |

FOREIGN PATENT DOCUMENTS

| | | | |
|---|---|---|---|
| JP | 8-119614 A | 5/1996 | |
| JP | 9-55342 A | 2/1997 | |
| JP | 10-208958 | 8/1998 | |
| JP | 11-121295 A | 4/1999 | |
| JP | 2000-113876 | 4/2000 | |
| JP | 2000-123633 A | 4/2000 | |
| JP | 2000-340470 | 12/2000 | |
| JP | 2000-344507 | 12/2000 | |
| JP | 2001146410 A | * 5/2001 | |
| JP | 2001-316103 | 11/2001 | |
| JP | 2003-272961 A | 9/2003 | |
| JP | 2003/347172 | 12/2003 | |
| JP | 2005-317642 | 11/2005 | |

OTHER PUBLICATIONS

Supplemental European Search Report for EP Patent Application No. EP07 80 6797 dated Aug. 12, 2010.

* cited by examiner

ELECTRIC DOUBLE LAYER CAPACITOR

TECHNICAL FIELD

The present invention relates to an electric double layer capacitor.

BACKGROUND ART

In recent years, electric double layer capacitors capable of charging and discharging with a large current have been attracting attention as electric power storage devices that hold promise for applications requiring frequent charge/discharge cycles, for example, as auxiliary power sources for electric vehicles, solar cells, wind power generation, etc. There is therefore a need for an electric double layer capacitor that has high energy density, is capable of fast charging and discharging, and has excellent durability.

An electric double layer capacitor comprises a pair of polarizable electrode layers as an anode and cathode disposed opposite each other with a separator interposed therebetween. Each polarizable electrode layer is impregnated with an aqueous or non-aqueous electrolytic solution, and is united with a current collector. With the aqueous type electrolytic solution, capacitance density can be increased to reduce resistance, but the operating voltage must be set lower than the voltage at which the electrolysis of water takes place; therefore, from the standpoint of increasing the energy density, the non-aqueous type is preferred for use.

In the past, electric double layer capacitors have been used primarily for such applications as memory backup and energy storage, but in recent years, electric double layer capacitors have been gaining attention for applications that require large current discharge, such as uninterruptible power supplies, and applications that require discharging under low temperature conditions, such as engine starters for hybrid electric vehicles, etc. For memory backup and energy storage applications, the capacitance density of the capacitor is an important factor, and to increase the capacitance density, activated carbon containing predominantly micropores of pore diameter smaller than 20 angstroms and thus providing a large specific surface area is used for polarizable electrode layers. However, if such polarizable electrode layers are used in applications that require a current of 10 mA/cm$^2$ or larger, problems such as the decrease of capacitance density, increase of energy loss, increase of heat generation, etc. become pronounced, because the mobility of electrolyte ions within the pores is limited. There is also the problem that, after long use, residues of decomposed materials may clog the pores, which can significantly degrade the durability.

In memory backup and energy storage applications, the capacitor is discharged at a relatively small current over time, but if polarizable electrode layers formed from predominantly microporous activated carbon, such as described above, are used in applications where the capacitor is discharged at a large current in a short time, the discharge efficiency decreases. This is because the time constant RC given by the product of internal resistance R and capacitance C is large, reducing the discharge efficiency which is given by the equation: (1−2RC) [time constant]/t[discharge time]. A method is known that aims to improve the performance by reducing the ratio of the specific surface area of the micropores in the activated carbon used for the polarizable electrode layers or by increasing the specific surface area or pore volume of mesopores so that the capacitor can be used in large current, quick discharge applications (Japanese Unexamined Patent Publications Nos. 2000-340470, H08-119614, 2001-316103, and 2001-89119). According to this method, the mobility of electrolyte ions within the pores of the activated carbon increases, serving to suppress the performance drop and the discharge efficiency drop that occur when the capacitor is used at a current of 10 mA/cm$^2$ or larger. However, none of Japanese Unexamined Patent Publications Nos. 2000-340470, H08-119614, 2001-316103, and 2001-89119 pay attention to the mobility of electrolyte ions in spaces other than the pores of the activated carbon (that is, the spaces in the interstices between the particles of the activated carbon, carbon black, etc. in the polarizable electrode layers), and it cannot be said that the method is effective enough in suppressing the performance drop. Especially, in the case of a large current discharge at 100 mA/cm$^2$ or larger, the mobility of electrolyte ions is insufficient, and problems such as the decrease of capacitance density, increase of energy loss, increase of heat generation, etc. become pronounced. On the other hand, in the case of a discharge at low temperatures of −20° C. or lower, the resistance increases and, as a result, the capacitance density decreases, thus limiting applications in a low-temperature environment.

On the other hand, with such predominantly mesoporous activated carbon, since its bulk density is small compared with predominantly microporous activated carbon, the capacitance density tends to decrease. Accordingly, in the case of predominantly mesoporous activated carbon, there is employed a method that increases the electrode density by compacting the activated carbon particles as closely as possible in order to compensate for the decrease in capacitance density. One common method employed to increase the density is to broaden the particle size distribution of the activated carbon and to fill the interstices of the large size activated carbon particles with smaller size activated carbon particles (Japanese Unexamined Patent Publication Nos. 2005-317642, 2003-347172, and 2000-344507).

It is also known to provide a method that mixes a thermoplastic resin, soluble polymer, etc. when molding the electrodes, and thereafter forms microscopic voids by heat treatment or cleaning in the interstices between the particles in order to ensure the mobility of electrolyte ions in spaces other than the pores of the activated carbon (that is, the spaces in the interstices between the particles of the activated carbon, carbon black, etc. in the polarizable electrode layers) (Japanese Unexamined Patent Publication Nos. H10-208985, H07-99141, and 2000-113876). Such methods, however, have had the problem that it is difficult to control the voids and the capacitance density decreases excessively. Furthermore, when performing heat treatment, there have been such problems as the pores of the activated carbon being shrunk under heat and an inability to use a polymer binder because of its heat resistance problem, and when performing cleaning by dissolving in a solvent, there has been the problem that the durability decreases because the solvent is adsorbed on the activated carbon; because of these and other problems, the above method has not been practicable.

There is also known a method that aims to enhance the performance by increasing the porosity of the electrodes as a whole (Japanese Unexamined Patent Publication No. H01-227417). In the method disclosed in Japanese Unexamined Patent Publication No. H01-227417, the mixing ratio of the activated carbon is adjusted, and the electrodes are produced by drawing, but with this method, since the porosity is increased by increasing the interstices between the particles, the capacitance density significantly drops. Furthermore, in Japanese Unexamined Patent Publication No. H01-227417, there is no mention of the capacitance density, and attention is focused only on the amount of volume change after a high-temperature load test.

Various kinds of materials are used as materials for activated carbon for capacitors; among others, natural (plant-derived) materials (such as coconut shells, wood, etc.) are used, because such materials are inexpensive and already contain numerous fine pores inherent in the materials before activation, and it is therefore easy to reduce the resistance. However, the fabrication of the polarizable electrode layers using such natural activated carbon has involved the problem that the material is difficult to mold because of such problems as the crushing of particles during molding and the sliding characteristics of the particles. That is, cracks can easily occur in the polarizable electrode layers, the reduction in film thickness by rolling is small, and so forth. As a result, to improve the moldability, an increased amount of solvent (molding agent) has had to be added when kneading the material. The solvent is removed by drying after molding the polarizable electrode layers, but it is difficult to completely remove the solvent, and if the solvent remains in the pores of the activated carbon, the durability of the capacitor decreases.

Further, there are cases where a low-viscosity nitrile-based organic solvent, such as an acetonitrile solvent, is used in order to improve the large current and low temperature characteristics, but since nitrile-based organic solvents generate toxic cyanide gas when burning, using such solvents is not desirable from the standpoint of safety.

DISCLOSURE OF THE INVENTION

Accordingly, it is an object of the present invention to provide an electric double layer capacitor suited to large current, quick discharge applications.

It is another object of the present invention to provide an electric double layer capacitor suited to applications in a low-temperature environment.

It is a further object of the present invention to improve the durability of the electric double layer capacitor suited to the above applications.

It is a still further object of the present invention to improve the safety of the electric double layer capacitor suited to the above applications.

It is a yet further object of the present invention to improve the moldability of polarizable electrode layers to be used in the electric double layer capacitor suited to the above applications.

According to the present invention, there is provided (1) an electric double layer capacitor comprising a polarizable electrode layer that contains an activated carbon, a conductive agent, and a binder, wherein an external specific surface area of the activated carbon (defined as a specific surface area calculated from a nitrogen absorption isotherm by a t-plot method by excluding micropores of pore diameter smaller than 20 angstroms), per unit volume of the polarizable electrode layer, lies within a range of 450 to 800 $m^2/cm^3$, and a volume based on inter-particle interstices per unit volume of the polarizable electrode layer lies within a range of 0.05 to 0.12 $cm^3/cm^3$.

According to the present invention, there is also provided (2) an electric double layer capacitor as defined in (1), wherein a relative particle quantity by volume in a mode diameter of a particle size distribution in the activated carbon lies within a range of 10 to 30%.

According to the present invention, there is also provided (3) an electric double layer capacitor as defined in (2), wherein particles contained within a range of ±30% of the mode diameter are 30 to 60% in terms of the relative particle quantity by volume.

According to the present invention, there is also provided (4) an electric double layer capacitor as defined in any one of (1) to (3), wherein the external specific surface area of the activated carbon lies within a range of 1000 to 2000 $m^2/g$.

According to the present invention, there is also provided (5) an electric double layer capacitor as defined in any one of (1) to (4), wherein the activated carbon is formed from a plant-derived natural material.

According to the present invention, there is also provided (6) an electric double layer capacitor as defined in (5), wherein the plant-derived natural material is a coconut shell.

According to the present invention, there is also provided (7) an electric double layer capacitor as defined in any one of (1) to (6), wherein the conductive agent is carbon black and is added in an amount not greater than 5% by mass with respect to the total mass of the polarizable electrode layer.

According to the present invention, there is also provided (8) an electric double layer capacitor as defined in any one of (1) to (7), further comprising an electrolytic solution which contains polypropylene carbonate as a solvent in an amount not less than 50% by mass with respect to the mass of the electrolytic solution.

According to the present invention, there is also provided (9) an electric double layer capacitor as defined in any one of (1) to (8), wherein capacitance measured under large-current discharge conditions is smaller by 35% or less than the capacitance measured under small-current discharge conditions that are the same as the large-current discharge conditions except that discharge current is 5 $mA/cm^2$, the large-current discharge conditions being defined as follows:

Charge: Constant current, constant voltage method
Discharge: Constant current method
Charge current: 5 $mA/cm^2$
Discharge current: 200 $mA/cm^2$
Charge voltage: 2.7 V
Charge time: 60 minutes
Discharge voltage: 0 V
Discharge temperature: 25° C.

According to the present invention, there is also provided

(10) an electric double layer capacitor as defined in any one of (1) to (8), wherein capacitance measured under low-temperature discharge conditions is smaller by 10% or less than the capacitance measured under normal-temperature discharge conditions that are the same as the low-temperature discharge conditions except that discharge temperature is 25° C., the low-temperature discharge conditions being defined as follows:

Charge: Constant current, constant voltage method
Discharge: Constant current method
Charge current: 5 $mA/cm^2$
Discharge current: 5 $mA/cm^2$
Charge voltage: 2.7 V
Charge time: 60 minutes
Discharge voltage: 0 V
Discharge temperature: −30° C.

According to the present invention, an electric double layer capacitor can be achieved that is suited to large current, quick discharge applications requiring large current such as 100 $mA/cm^2$ or larger, and/or applications in a low-temperature environment such as −20° C. or lower. Further, according to the present invention, the durability and/or safety of the electric double layer capacitor suited to such applications are enhanced. Furthermore, according to the present invention, the moldability of the polarizable electrode layers for the electric double layer capacitor suited to such applications improves.

BEST MODE FOR CARRYING OUT THE INVENTION

An electric double layer capacitor according to the present invention comprises a polarizable electrode layer containing an activated carbon, a conductive agent, and a binder, wherein the external specific surface area of the activated carbon, per unit volume of the polarizable electrode layer, lies within a range of 450 to 800 $m^2/cm^3$, and the volume based on the inter-particle interstices per unit volume of the polarizable electrode layer lies within a range of 0.05 to 0.12 $cm^3/cm^3$. In this specification, the external specific surface area of the activated carbon is defined as the "specific surface area calculated from a nitrogen absorption isotherm by a t-plot method by excluding micropores of pore diameter smaller than 20 angstroms." Further, the polarizable electrode layer is defined in this specification as the "layer containing an activated carbon, a conductive agent, and a binder (which may include an additive such as a sliding agent)." That is, the polarizable electrode layer does not include a current collector nor an adhesive layer used for bonding the current collector to the polarizable electrode layer.

Figure 1:
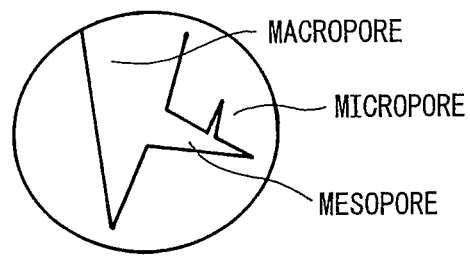
FIG. 1 is a conceptual diagram showing various kinds of pores of activated carbon.

The pores of the activated carbon are classified, in accordance with the IUPAC classification, as micropores whose pore diameter is smaller than 20 angstroms, mesopores whose pore diameter lies in the range of 20 to 500 angstroms, and macropores whose pore diameter is larger than 500 angstroms. FIG. 1 is a conceptual diagram showing these pores. The external specific surface area according to the present invention refers to the internal surface area of the mesopores and macropores plus the external surface area of the activated carbon.

The present invention aims to provide an electric double layer capacitor suited to large current applications and/or low temperature applications by focusing attention not only on the surface area characteristics of the activated carbon itself but also on the inter-particle interstices of the polarizable electrode layer. As previously described, electric double layer capacitors for large current applications have been known in which the specific surface area of the mesopores is increased by focusing attention on the mobility of electrolyte ions within the pores of the activated carbon (Japanese Unexamined Patent Publications Nos. 2000-340470, H08-119614, 2001-316103, and 2001-89119). However, these prior art techniques completely lack awareness of the mobility of electrolyte ions in the inter-particle interstices of the polarizable electrode layer, and the performance increase in the case of a large current discharge has been limited. That is, in the case of a large current discharge at 100 $mA/cm^2$ or larger, in particular, problems such as the decrease of capacitance density, increase of energy loss, increase of heat generation, etc. become pronounced; on the other hand, in the case of a discharge at low temperatures of −20° C. or lower, the resistance increases and, as a result, the capacitance density decreases. Technical common knowledge dictates that, in the case of predominantly mesoporous activated carbon, the packing density of the activated carbon should be increased as much as possible in order to compensate for the decrease of the capacitance density, but on the contrary, the present inventors have discovered that there exists a certain relationship between the surface area characteristics of the activated carbon itself and the volume based on the inter-particle interstices of the polarizable electrode layer such that when the packing density of the activated carbon is reduced, the mobility of electrolyte ions is further optimized throughout the polarizable electrode layer for large current applications and/or low temperature applications.

Figure 2:
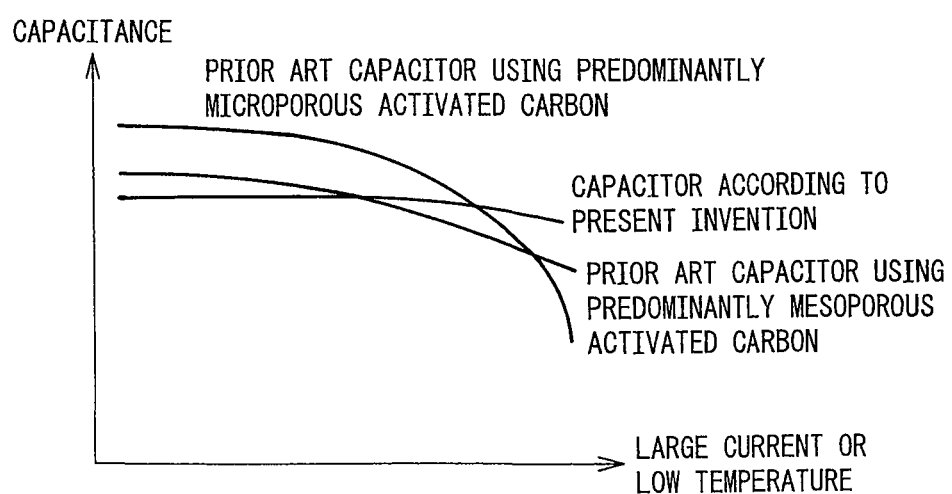
FIG. 2 is a diagram schematically showing how the capacitance of an electric double layer capacitor changes as discharge current increases or discharge temperature decreases.

FIG. 2 is a diagram schematically showing how the capacitance of an electric double layer capacitor changes as the discharge current increases or the discharge temperature decreases. In the case of a prior art capacitor that uses activated carbon containing predominantly micropores of pore diameter smaller than 20 angstroms, the capacitance is the highest when discharging at a small current or at normal temperature, but the capacitance rapidly decreases as the discharge current increases or the discharge temperature decreases. In the case of a capacitor that uses activated carbon prepared by increasing the specific surface area of the mesopores with a pore diameter of 20 to 500 angstroms, as disclosed in Japanese Unexamined Patent Publications Nos. 2000-340470, H08-119614, 2001-316103, and 2001-89119, the capacitance when discharging at a small current or at normal temperature is lower than that of the predominantly microporous activated carbon, but the decrease of the capacitance with increasing discharge current or decreasing discharge temperature is relatively mild. By contrast, in the case of the capacitor according to the present invention in which the surface area characteristics of the activated carbon itself and the volume based on the inter-particle interstices of the polarizable electrode layer are balanced relative to each other, the capacitance when discharging at a small current or at normal temperature is lower than the above two capacitors, but the decrease of the capacitance with increasing discharge current or decreasing discharge temperature is much milder; in particular, in applications requiring a large current discharge at 100 $mA/cm^2$ or larger or in a low-temperature environment such as −20° C. or lower, the electric double layer capacitor of the invention achieves a higher capacitance than the above two capacitors.

Activated carbon having an external specific surface area of 1000 to 2000 $m^2/g$, preferably 1200 to 1800 $m^2/g$, and more preferably 1400 to 1550 $m^2/g$, is used in the present invention. If the external specific surface area is smaller than 1000 $m^2/g$, the resistance of the polarizable electrode layer and the time constant cannot be reduced sufficiently, and the performance tends to drop when discharging at a large current or in a low-temperature environment. On the other hand, if the external specific surface area is larger than 2000 $m^2/g$, the bulk density of the material significantly decreases, and the density of the polarizable electrode layer (hereinafter called the "electrode density") thus decreases; as a result, the capacitance density greatly decreases. The external specific surface area is usually measured by nitrogen absorption, the same method as used for the measurement of the specific surface area and pore distribution of the activated carbon, and is calculated from a nitrogen absorption isotherm by a t-plot method by excluding the micropores of pore diameter smaller than 20 angstroms. For details of the analysis by the t-plot method, refer to a relevant document (for example, Shimadzu Review, Vol. 48, No. 1, p. 35, June 1991). In the working examples to be described later, an activated carbon material vacuum-dried at 150° C. for four hours was measured by nitrogen absorption using Shimadzu-Micromeritics ASAP 2010, and the external specific surface area was calculated using the following data of the t-plot method proposed by De-Boor et al. A t-plot is a plot of the total quantity of adsorbed gas (g/cm$^3$: standard condition) versus the thickness t (nm) of the adsorbed gas layer. If the sample contains micropores and mesopores in a mixed manner, the t-plot will show a linear region that has a positive intercept on the vertical axis; therefore, the external specific surface area ($S_{ext}$) was calculated from the slope α of the linear region between 0.35 to 0.5 nm.

$$S_{ext}=α×1000×0.001547 \text{(density conversion coefficient when nitrogen is used)}$$

The external specific surface area per unit volume of the polarizable electrode layer is obtained by multiplying the above external specific surface area by the electrode density, then by the mass ratio of the activated carbon in the polarizable electrode layer.

External specific surface area per unit volume of polarizable electrode layer (m$^2$/cm$^3$)=External specific surface area of activated carbon (m$^2$/g)×Electrode density (g/cm$^3$)×Mass ratio of activated carbon in polarizable electrode layer (no unit: unity when the material is all activated carbon)

The external specific surface area per unit volume of the polarizable electrode layer is preferably 450 to 800 m$^2$/cm$^3$, and more preferably 560 to 680 m$^2$/cm$^3$. When the external specific surface area per unit volume of the polarizable electrode layer is within the above range, the decrease of the capacitance when discharging at a large current or in a low-temperature environment can be suppressed. If the external specific surface area per unit volume of the polarizable electrode layer is smaller than 450 m$^2$/cm$^3$, the performance tends to drop in quick charging/discharging or in low-temperature regions. Conversely, if it is larger than 800 m$^2$/cm$^3$, the capacitance density greatly decreases as the electrode density decreases.

The electrode density is a value that includes neither the current collector nor the adhesive layer, and the measurement can be made directly on the polarizable electrode layer sheet (hereinafter called the "electrode sheet") fabricated by a sheet forming method. After the electrode sheet cut to a prescribed size is dried for approximately one hour at 150° C., the electrode density is calculated by measuring the mass and the area and thickness of the electrode sheet. In the case of a polarizable electrode layer formed integrally with the current collector by a coating method or the like, the electrode density is calculated by first measuring the total density including the current collector and then subtracting the density of the current collector from the total density.

The present invention is characterized in that the surface area characteristics of the activated carbon itself and the volume based on the inter-particle interstices of the polarizable electrode layer are balanced relative to each other in order to further optimize the mobility of electrolyte ions throughout the polarizable electrode layer for large current applications and/or low temperature applications, that is, the external specific surface area per unit volume of the polarizable electrode layer lies within the above-defined range while, at the same time, the volume based on the inter-particle interstices per unit volume of the polarizable electrode layer lies within a range of 0.05 to 0.12 cm$^3$/cm$^3$, and preferably within a range of 0.07 to 0.11 cm$^3$/cm$^3$. If the volume based on the inter-particle interstices per unit volume of the polarizable electrode layer is smaller than 0.05 cm$^3$/cm$^3$, the performance tends to drop in quick charging/discharging or in low-temperature regions. Conversely, if it is larger than 0.12 cm$^3$/cm$^3$, the capacitance density greatly decreases as the electrode density decreases.

The volume based on the inter-particle interstices per unit volume of the polarizable electrode layer can be calculated from the following data in the manner described below.

(1) Electrode density (g/cm$^3$)
(2) Mass ratio of activated carbon in polarizable electrode layer (unity when the material is all activated carbon)
(3) Total pore volume of activated carbon (cm$^3$/g) (by nitrogen absorption)
(4) Total pore volume of polarizable electrode layer (cm$^3$/g)

First, the mass of the activated carbon in unit volume of the polarizable electrode layer (5) is calculated from the values of (1) and (2) ((5)=Electrode density×Mass ratio of activated carbon in polarizable electrode layer). Next, the pore volume of the activated carbon in unit volume of the polarizable electrode layer (6) is calculated from the values of (5) and (3) ((6)=Mass of activated carbon in unit volume of polarizable electrode layer×Total pore volume of activated carbon). On the other hand, the total pore volume in unit volume of the polarizable electrode layer (7) is calculated from the values of (1) and (4) ((7)=Electrode density×Total pore volume of polarizable electrode layer), and the value of (6) is subtracted from the value of (7) to obtain the volume based on the inter-particle interstices per unit volume of the polarizable electrode layer. The value of (3) is obtained from the nitrogen absorption isotherm at 77K by the BJH method. The value of (4) is measured by mercury porosimetry. Prior to the measurement, the sample is vacuum-dried at 150° C. for 24 hours, and the distribution of pores in the range of 0.0018 to 100 μm is measured using a Micromeritics Autopore III 9420, to obtain the cumulative pore volume.

To achieve the volume based on the inter-particle interstices described above, it is preferable to use activated carbon whose relative particle quantity by volume in the mode diameter of the particle size distribution lies within a range of 10 to 30%. When activated carbon having such a sharp particle size distribution is used, the inter-particle interstices increase compared with the prior art activated carbon in which the electrode density is increased by broadening the particle size distribution of the activated carbon and filling the interstices of the large size activated carbon particles with smaller size activated carbon particles (Japanese Unexamined Patent Publication Nos. 2005-317642, 2003-347172, and 2000-344507). If the relative particle quantity is less than 10%, the inter-particle interstices decrease, and the performance tends to drop when discharging at a large current as well as in a low-temperature environment. On the other hand, if the relative particle quantity exceeds 30%, the inter-particle interstices increase excessively, and the capacitance density decreases markedly; in the first place, such a particle size distribution is, in itself, difficult to achieve, and it can also lead town increase in manufacturing cost. The relative particle quantity by volume in the mode diameter of the particle size distribution of the activated carbon is preferably within a range of 13 to 25%, and more preferably within a range of 15 to 20%.

According to the present invention, it is further preferable that the particles contained in the range of ±30% of the mode diameter are 30 to 60% in terms of the relative particle quantity by volume. By enhancing the monodispersity of the particle size of the activated carbon in this way, the uniformity of the inter-particle interstices further increases. If the relative particle quantity lying in the range of ±30% of the mode diameter is smaller than 30%, the inter-particle interstices decrease, and the performance tends to drop when discharging at a large current as well as in a low-temperature environment; besides, when fabricating the polarizable electrode layer using a natural activated carbon material, the moldability worsens, and the required amount of molding agent increases. On the other hand, if the relative particle quantity lying in the range of ±30% of the mode diameter exceeds 60%, the inter-particle interstices increase excessively, and the capacitance density decreases markedly; in the first place, such a particle size distribution is, in itself, difficult to achieve, and it can also lead to an increase in manufacturing cost. The relative particle quantity lying in the range of ±30% of the mode diameter is preferably 40 to 55%.

To measure the particle size distribution of the activated carbon, the activated carbon (in an amount equivalent to one small dispensing spoon) is dispersed in 5 mL of a 0.4% solution of Triton, and the solution is charged into a sampler filled with ion exchanged water; then, the measurement is made by a Shimadzu SALD-2000 under the following conditions, that is, refractive index: 1.70 to 0.20i, dispersion time: 1 minute, cell: flowcell, and medium: ion exchanged water. The frequency and the cumulative data of the relative particle quantity (q3) can be used as data, and the measured data can be loaded using a Windows (registered trademark) personal computer software "EXCEL" (registered trademark) to construct a graph by joining the measured points with smoothed lines. After enlarging the graph, the mode diameter is visually read from the frequency graph. Further, the particle quantity at the particle sizes corresponding to the range of ±30% of the mode diameter is read from the cumulative graph, and the difference is calculated to obtain the particle quantity lying in the range of ±30% of the mode diameter.

For the activated carbon, various materials can be used, including plant-derived wood, coconut shells, pulp spent liquor, fossil fuels such as coal or petroleum heavy oil, coal or petroleum-based pitch or coke obtained by thermally cracking such fossil fuels, synthetic resins such as phenol resin, furan resin, polyvinyl chloride resin, polyvinylvinylidene chloride resin, etc. Among others, the so-called natural (plant-derived) materials, such as wood and coconut shells, are preferable because these materials already contain numerous capillaries or fine pores before activation. Since such natural materials contain open-ended pores in the form of capillaries before activation, it is believed that the electrolyte ions can move smoother than in closed-end pores that would be formed by activation.

It is known that activated carbon made of natural material is generally intractable and has problems such as cracking of polarizable electrode layers, poor rollability, etc. However, according to the present invention, by using activated carbon having a sharp particle size distribution as earlier described, the sliding characteristics of the particles improve, which serves to improve the moldability of the polarizable electrode layers. It also becomes possible to reduce the amount of the molding agent used for improving the moldability, and as a result, the amount of the solvent remaining after drying can be reduced, alleviating the degradation of durability.

Activated carbon can be produced using various activation methods such as gas activation and chemical activation. Examples of the gases that can be used for gas activation include water vapor, carbon dioxide, oxygen, chlorine, sulfur dioxide, sulfur stream, etc. Examples of the chemicals that can be used for chemical activation include zinc chloride, potassium hydroxide, sodium hydroxide, potassium carbonate, sodium carbonate, phosphoric acid, calcium chloride, potassium sulfide, etc.

Activated carbon can be milled by either a dry or wet method, and various milling methods can be used, such as ball milling, turbo milling, jet milling, impact milling, and hammer milling. If the desired particle size distribution cannot be achieved by milling alone, the particle size may be adjusted by sieving and classifying the particles. Classification can be performed by either a dry or wet method, and various methods can be used, such as a vibration method, an ultrasonic method, a centrifugal method, and a sedimentation method.

The polarizable electrode layer according to the present invention generally contains a conductive agent for conferring electrical conductivity to the activated carbon. Carbon black such as Ketjen black or acetylene black, vapor growth carbon fiber, nanocarbon such as fullerene, carbon nanotube, or carbon nanohorn, or powdered or granular graphite or the like can be used as the conductive agent. According to the present invention, it is preferable that the conductive agent is carbon black and is added in an amount not greater than 5% by mass, with respect to the total mass of the polarizable electrode layer including the conductive agent, activated carbon, binder, and other constituent materials. The total mass of the polarizable electrode layer is the dry mass measured after removing the molding agent used when molding the polarizable electrode layer. The conductive agent is used to reduce the contact resistance between the activated carbon particles; in the prior art polarizable electrode layer, the conductive agent was usually added in an amount greater than 5% by mass. However, when the amount of the conductive agent is thus increased, the moldability of the polarizable electrode layer worsens, causing problems such as cracking, poor rollability, etc. Furthermore, since its particle size is smaller than that of the activated carbon, if the conductive agent is not dispersed uniformly, there arises the problem that its particles fill the inter-particle interstices of the polarizable electrode layer and thus impede the diffusion of the electrolytic solution. In the polarizable electrode layer according to the present invention, the effect of reducing the diffusion resistance is great, which serves to mitigate the effect of the contact resistance between the particles, so that the amount of the conductive agent can be reduced compared with the prior art. This alleviates the problems that the moldability of the polarizable electrode layer worsens, and that the inter-particle interstices of the polarizable electrode layer are filled with the conductive agent.

The polarizable electrode layer according to the present invention generally contains a binder for binding together the activated carbon and the conductive agent. A known material such as polytetrafluoroethylene (PTFE), polyvinylidene fluoride (PVDF), polyethylene (PE), polypropylene (PP), styrene-butadiene rubber (SBR), acrylonitrile-butadiene rubber (NBR), etc. can be used as the binder. The binder should be added preferably in an amount of 1% to 30% by mass, and more preferably in an amount of 3% to 20% by mass, with respect to the total mass of the polarizable electrode layer including the binder, activated carbon, conductive agent, and other constituent materials (the dry mass after removing the molding agent). If the amount of the binder added is smaller than 1% by mass, it becomes difficult to hold the activated carbon within the polarizable electrode layer. Conversely, if the amount added exceeds 30% by mass, the energy density of the electric double layer capacitor decreases, and the internal resistance increases.

The polarizable electrode layer according to the present invention can be fabricated by a sheet forming method or a coating method or the like. For example, in the case of the sheet forming method, after the particle size of the activated carbon prepared by the earlier described method has been adjusted so that the mean particle size D50 falls within the range of about 5 to 200 μm, the conductive agent and binder are added to the activated carbon, and the mixture is kneaded and rolled-down into a sheet-like form. When kneading, liquid agents such as water, ethanol, acetonitrile, etc. may be added singly or mixed in a suitable combination. The thickness of the polarizable electrode layer is preferably 50 to 1000 μm, and more preferably 60 to 500 μm. If the thickness is smaller than 50 μm, the volume that the current collector occupies in the electric double layer capacitor increases, and the energy density decreases. Conversely, if the thickness exceeds 1000 μm, the internal resistance of the electric double layer capacitor increases. The values of the polarizable electrode layer thickness given here were obtained by measuring it using a dial thickness gauge "SM-528" manufactured by Teclock Co., Ltd., without applying any load other than the instrument's spring load.

The electric double layer capacitor has a structure in which the pair of electrodes as the anode and cathode, each comprising a polarizable electrode layer and a sheet-like current collector in an integral fashion, are disposed opposite each other with a separator interposed therebetween. An insulating material, such as microporous paper or glass or a porous plastic film of polyethylene, polypropylene, polyimide, polytetrafluoroethylene, or the like, can be used for the separator. The separator thickness is generally in the range of about 10 to 100 μm.

For the electrolyte in the electrolytic solution, commonly used materials such as quaternary ammonium salt, quaternary imidazolium salt, quaternary pyridinium salt, quaternary pyrollidinium salt, quaternary phosphonium salt, etc. can be used singly or in a combination of two or more. For the counter-anions in the electrolyte, $BF_4^-$, $PF_6^-$, $AsF_6^-$, $ClO_4^-$, $CF_3SO_3^-$, $(CF_3SO_2)_2N^-$, $AlCl_4^-$, $SbF_6^-$, etc. are preferable from the viewpoint of electrochemical stability and molecular ion diameter; among others, $BF_4^-$ is particularly preferable.

The electrolyte may be used without dilution if it is a liquid at room temperature, but generally it is preferable to use it in the form of an electrolytic solution by dissolving it in an organic solvent. By using an organic solvent, the viscosity of the electrolytic solution can be reduced to suppress an increase in the internal resistance of the electrode. Examples of the organic solvent used here include carbonates such as ethylene carbonate, propylene carbonate, diethyl carbonate, butylene carbonate, dimethyl carbonate, and vinylene carbonate, lactones such as γ-butyrolactone, ethers such as 1,2-dimethoxyethane, diethylene glycol dimethyl ether, ethylene oxide, propylene oxide, tetrahydrofuran, and 1,3-dioxolane, sulfur-containing compounds such as dimethyl sulfoxide and sulfolane, amides such as formamide, N-methylformamide, N,N-dimethylformamide, N,N-diethylformamide, and N-methyl acetamide, dialkyl ketones such as methylethyl ketone and methyl isobutyl ketone, and other organic solvents such as N-methylpyrrolidone and nitromethane, from which a suitable one may be selected by considering such factors as the solubility of the electrolyte and the reactivity with the electrode. The above organic solvents may be used singly, or two or more kinds of solvents may be mixed together in a suitable combination. The electrolyte concentration in the electrolytic solution is preferably 0.5 mol/L or higher, and more preferably 1.0 mol/L or higher. The upper limit of the electrolyte concentration depends on the solubility determined by each specific combination of the electrolyte and organic solvent. For the solvent of the electrolytic solution, when viscosity, boiling point, melting point, relative permittivity, electrochemical stability, etc. are considered, it is preferable that propylene carbonate is contained in an amount not less than 50% by mass with respect to the mass of the electrolytic solution.

The present invention can also be applied to a hybrid capacitor (asymmetric capacitor) in which a polarizable electrode layer made of activated carbon and an electrode layer made of a material other than activated carbon are used in combination as the anode and cathode, respectively, and the electric double layer capacitor as defined in the present invention includes such a hybrid capacitor. More specifically, when only one of the pair of polarizable electrode layers in the electric double layer capacitor is constructed from the polarizable electrode layer made of activated carbon in accordance with the present invention, and the other is constructed from an electrode layer made of a material other than activated carbon, the effect of the present invention so far described can also be achieved. For example, when the polarizable electrode layer according to the present invention is employed for the anode of the electric double layer capacitor disclosed in Japanese Unexamined Patent Publication No. 2004-134658, the capacitor performance (capacitance, durability, safety, etc.) for large current applications and/or low temperature applications improves.

WORKING EXAMPLES

The present invention will be described in detail below with reference to working examples.

Working Example 1

A coconut shell as a material for activated carbon was heated at 800° C. in an inert atmosphere to obtain a carbonized material, which was then steam-activated for 120 minutes at 900° C. After that, the material was cooled to room temperature, rinsed with water, and dried. The thus produced activated carbon was milled by a jet mill, and the particles were classified to obtain activated carbon having a particle size distribution with a mode diameter of 20 μm (relative particle quantity: 15%) in which 50% of the particles were contained within the range of ±30% of the mode diameter (the range of 14 to 26 μm). The pore volume of the resulting activated carbon was 1.07 $cm^3$/g, the specific surface area was 2000 $m^2$/g, and the external specific surface area was 1500 $m^2$/g.

Figure 3:
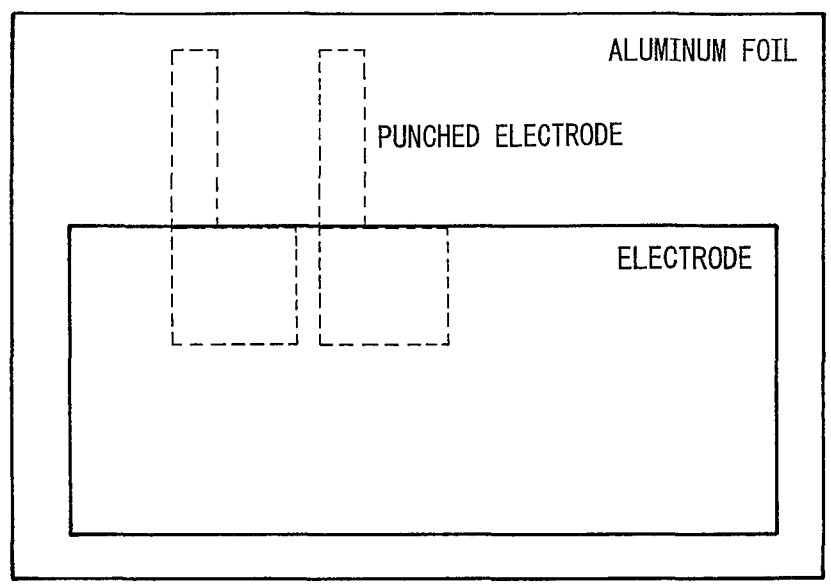
FIG. 3 is a simplified top plan view showing a method for punching out an electrode fabricated in a working example.

30% by mass of ethanol was added to a mixture consisting of 85% by mass of the activated carbon, 5% by mass of Ketjen black powder as a conductive agent ("EC600JD" manufactured by Ketjen Black International Co., Ltd), and 10% by mass of polytetrafluoroethylene powder as a binder ("TEFLON (registered trademark) 6J" manufactured by Mitsui DuPont Fluorochemicals Co., Ltd.), and the resulting mixture was kneaded and then the resulting paste was extruded to obtain a tape-like extrudate. Next, the tape-like extrudate was passed through rolls (roll spacing: 0.1 mm) twice to form a 150-μm thick electrode sheet (the number of rolling passes required was 2). Then, the sheet was dried for one hour at 150° C. to remove the ethanol, to obtain an electrode sheet (polarizable electrode layer) of width 100 mm and thickness 150 μm. The electrode density of the obtained electrode sheet was 0.48 g/$cm^3$, the external specific surface area per unit volume of the electrode sheet was 612 $m^2$/$cm^3$, the pore volume of the entire electrode sheet was 1.09 $cm^3$/g, and the volume based on the inter-particle interstices per unit volume of the electrode sheet was 0.09 cm³/cm³. A high-purity etched aluminum foil of width 150 mm and thickness 50 μm ("C512" manufactured by KDK Corporation) was used as a current collector, and a conductive adhesive liquid ("GA-37" manufactured by Hitachi Powdered Metals Co., Ltd.) was applied over one surface of the current collector; then, the electrode sheet was placed over the current collector, and the electrode sheet and the current collector were laminated together by passing them through compression rolls, to obtain a laminated sheet with their contacting faces bonded together. The laminated sheet was then placed in an oven whose temperature was controlled to 150° C., and the sheet was held therein for 10 minutes to remove the dispersion medium by evaporation from the conductive adhesive liquid layer. Next, the laminated sheet was diecut to form a rectangular-shaped electrode with its carbon electrode portion measuring 3 cm square and its lead portion (the portion where the current collector was not covered with the polarizable electrode) measuring 1×5 cm, as shown in FIG. 3. Two such electrodes were set up as an anode and a cathode, respectively, and an 80-μm thick, 3.5-cm square hydrophilized ePTFE sheet ("BSP0708070-2" manufactured by Japan Gore-Tex Inc.) was inserted as a separator between them; then, the electrodes and the separator were placed between two aluminum-laminated sheets ("PET12/A120/PET12/CPP30 dry laminated sheets measuring 5×10 cm manufactured by Showa Denko Packaging Co., Ltd.), and three sides including the lead portion side were heat-sealed to produce an aluminum pack cell. Here, an end of the lead portion was brought outside the aluminum pack cell so that the lead portion and the aluminum pack cell were sealed together when the lead portion and the aluminum laminated sheets were heat-sealed. Next, the aluminum pack cell was vacuum dried at 150° C. for 24 hours, after which the cell was introduced into a glove box where a dew point of −60° C. or lower was maintained in an argon atmosphere; then, with the open side (the side not sealed) facing up, 4 mL of a propylene carbonate solution containing 1.5 mol/L of triethylmethylammonium tetrafluoroborate was injected as the electrolytic solution into the aluminum pack cell, and the aluminum pack cell was left stationary at a reduced pressure of −0.05 MPa for 10 minutes, allowing the gasses contained in the electrodes to be replaced with the electrolytic solution. Finally, the open side of the aluminum pack cell was sealed by heating, to produce a single laminated type electric double layer capacitor. This electric double layer capacitor was stored at 40° C. for 24 hours, thus aging the electrolytic solution including the solution impregnated into the electrodes. After that, the capacitor was sandwiched between 5-mm thick SUS plates each measuring 5×5 cm, and a compression pressure of 1 MPa was applied from the surface side; this capacitor is designated as the capacitor of Working example 1.

Working Example 2

Working example 1 was repeated except that the activation time was 90 minutes, the pore volume was 0.93 cm³/g, the specific surface area was 1600 m²/g, and the external specific surface area was 1100 m²/g. The number of rolling passes required to form the 150-μm thick electrode sheet was two, which was the same as Working example 1. The electrode density of the obtained electrode sheet was 0.52 g/cm³, the external specific surface area per unit volume of the electrode sheet was 486 m²/cm³, the pore volume of the entire electrode sheet was 0.98 cm³/g, and the volume based on the inter-particle interstices per unit volume of the electrode sheet was 0.10 cm³/cm³.

Working Example 3

Working example 1 was repeated except that the activation time was 160 minutes, the pore volume was 1.15 cm³/g, the specific surface area was 2400 m²/g, and the external specific surface area was 1900 m²/g. The number of rolling passes required to form the 150-μm thick electrode sheet was two, which was the same as Working example 1. The electrode density of the obtained electrode sheet was 0.45 g/cm³, the external specific surface area per unit volume of the electrode sheet was 727 m²/cm³, the pore volume of the entire electrode sheet was 1.17 cm³/g, and the volume based on the inter-particle interstices per unit volume of the electrode sheet was 0.09 cm³/cm³.

Working Example 4

Working example 1 was repeated except that activated carbon was used that had a particle size distribution with a mode diameter of 20 μm (relative particle quantity: 25%) in which 60% of the particles were contained within the range of ±30% of the mode diameter. The number of rolling passes required to form the 150-μm thick electrode sheet was two, which was the same as Working example 1. The electrode density of the obtained electrode sheet was 0.46 g/cm³, the external specific surface area per unit volume of the electrode sheet was 587 m²/cm³, the pore volume of the entire electrode sheet was 1.12 cm³/g, and the volume based on the inter-particle interstices per unit volume of the electrode sheet was 0.10 cm³/cm³.

Working Example 5

Working example 1 was repeated except that activated carbon was used that had a particle size distribution with a mode diameter of 20 μm (relative particle quantity: 12%) in which 35% of the particles were contained within the range of ±30% of the mode diameter. The number of rolling passes required to form the 150-μm thick electrode sheet was three. The electrode density of the obtained electrode sheet was 0.51 g/cm³, the external specific surface area per unit volume of the electrode sheet was 650 m²/cm³, the pore volume of the entire electrode sheet was 1.04 cm³/g, and the volume based on the inter-particle interstices per unit volume of the electrode sheet was 0.07 cm³/cm³.

Working Example 6

Working example 1 was repeated except that the proportions of the materials were changed to 80% by mass of the activated carbon, 10% by mass of the conductive agent, and 10% by mass of the binder. The number of rolling passes required to form the 150-μm thick electrode sheet was four. The electrode density of the obtained electrode sheet was 0.52 g/cm³, the external specific surface area per unit volume of the electrode sheet was 624 m²/cm³, the pore volume of the entire electrode sheet was 1.01 cm³/g, and the volume based on the inter-particle interstices per unit volume of the electrode sheet was 0.08 cm³/cm³.

Working Example 7

Working example 1 was repeated except that a phenol resin was used as the material for the activated carbon, the pore volume was 1.00 cm³/g, the specific surface area was 2000 m²/g, and the external specific surface area was 1400 m²/g. The number of rolling passes required to form the 150-μm thick electrode sheet was two, which was the same as Working example 1. The electrode density of the obtained electrode sheet was 0.50 g/cm³, the external specific surface area per unit volume of the electrode sheet was 595 m²/cm³, the pore volume of the entire electrode sheet was 1.00 cm³/g, and the volume based on the inter-particle interstices per unit volume of the electrode sheet was 0.08 cm³/cm³.

Comparative Example 1

Working example 1 was repeated except that traditionally used steam-activated coconut-shell-based activated carbon YP manufactured by Kuraray Chemical (pore volume: 0.77 cm³/g, specific surface area: 1700 m²/g, the external specific surface area: 450 m²/g) was used. The number of rolling passes required to form the 150-μm thick electrode sheet was two, which was the same as Working example 1. The electrode density of the obtained electrode sheet was 0.58 g/cm³, the external specific surface area per unit volume of the electrode sheet was 222 m²/cm³, the pore volume of the entire electrode sheet was 0.75 cm³/g, and the volume based on the inter-particle interstices per unit volume of the electrode sheet was 0.06 cm³/cm³.

Comparative Example 2

Working example 1 was repeated except that the activation time was 80 minutes, the pore volume was 0.89 cm³/g, the specific surface area was 1400 m²/g, and the external specific surface area was 900 m²/g. The number of rolling passes required to form the 150-μm thick electrode sheet was two, which was the same as Working example 1. The electrode density of the obtained electrode sheet was 0.55 g/cm³, the external specific surface area per unit volume of the electrode sheet was 421 m²/cm³, the pore volume of the entire electrode sheet was 0.90 cm³/g, and the volume based on the inter-particle interstices per unit volume of the electrode sheet was 0.08 cm³/cm³.

Comparative Example 3

Working example 1 was repeated except that the activation time was 180 minutes, the pore volume was 1.25 cm³/g, the specific surface area was 2900 m²/g, and the external specific surface area was 2200 m²/g. The number of rolling passes required to form the 150-μm thick electrode sheet was two, which was the same as Working example 1. The electrode density of the obtained electrode sheet was 0.43 g/cm³, the external specific surface area per unit volume of the electrode sheet was 804 m²/cm³, the pore volume of the entire electrode sheet was 1.23 cm³/g, and the volume based on the inter-particle interstices per unit volume of the electrode sheet was 0.07 cm³/cm³.

Comparative Example 4

Working example 1 was repeated except that activated carbon was used that had a particle size distribution with a mode diameter of 20 μm (relative particle quantity: 8%) in which 20% of the particles were contained within the range of ±30% of the mode diameter. The number of rolling passes required to form the 150-μm thick electrode sheet was four. The electrode density of the obtained electrode sheet was 0.53 g/cm³, the external specific surface area per unit volume of the electrode sheet was 676 m²/cm³, the pore volume of the entire electrode sheet was 0.99 cm³/g, and the volume based on the inter-particle interstices per unit volume of the electrode sheet was 0.04 cm³/cm³.

The external specific surface area of the activated carbon, the particle quantity in the range of ±30% of the mode diameter, the external specific surface area of the activated carbon per unit volume of the electrode sheet, and the volume based on the inter-particle interstices per unit volume of the electrode sheet are shown in Table 1 below for Working example 1 to 7 and Comparative example 1 to 4.

| | EXTERNAL SPECIFIC SURFACE AREA OF ACTIVATED CARBON [m²/g] | RELATIVE PARTICLE QUANTITY WITH MODE DIAMETER [%] | RELATIVE PARTICLE QUANTITY WITHIN ±30% OF MODE DIAMETER [%] | EXTERNAL SPECIFIC SURFACE AREA PER UNIT VOLUME OF ELECTRODE [m²/cm³] | INTER-PARTICLE INTERSTICES PER UNIT VOLUME [cm³/cm³] | NUMBER OF ROLLING PASSES REQUIRED |
|---|---|---|---|---|---|---|
| WORKING EXAMPLE 1 | 1500 | 15 | 50 | 612 | 0.09 | 2 |
| WORKING EXAMPLE 2 | 1100 | 15 | 50 | 486 | 0.10 | 2 |
| WORKING EXAMPLE 3 | 1900 | 15 | 50 | 727 | 0.09 | 2 |
| WORKING EXAMPLE 4 | 1500 | 25 | 60 | 587 | 0.10 | 2 |
| WORKING EXAMPLE 5 | 1500 | 12 | 35 | 650 | 0.07 | 3 |
| WORKING EXAMPLE 6 | 1500 | 15 | 50 | 624 | 0.08 | 4 |
| WORKING EXAMPLE 7 | 1400 | 15 | 50 | 595 | 0.08 | 2 |
| COMPARATIVE EXAMPLE 1 | 450 | 15 | 50 | 222 | 0.06 | 2 |
| COMPARATIVE EXAMPLE 2 | 900 | 15 | 50 | 421 | 0.08 | 2 |
| COMPARATIVE EXAMPLE 3 | 2200 | 15 | 50 | 804 | 0.07 | 2 |
| COMPARATIVE EXAMPLE 4 | 1500 | 8 | 20 | 676 | 0.04 | 4 |

*IN ELECTRODE OF COMPARATIVE EXAMPLE 4, MANY CRACKS OCCURRED DURING MOLDING.

The capacitor cells of Working examples 1 to 7 and Comparative examples 1 to 4 fabricated as described above were tested under the following conditions.
(Power-Up)
  Charge: 5 mA/cm$^2$, 2.7 V, 60 minutes, CCCV method
  Discharge: 5 mA/cm$^2$, 0 V, 20 cycles, 25° C.
The capacitance, internal resistance, and time constant measured at the end of the 20th cycle under the above conditions are shown in Table 2.
(Large Current Characteristics)
  Charge: 5 mA/cm$^2$, 2.7 V, 60 minutes, CCCV method
  Discharge: 200 mA/cm$^2$, 0 V, 1 cycle, 25° C.
The capacitance measured under the above conditions and the percentage of change in capacitance from the capacitance at the 5-mA/cm$^2$ discharge are shown in Table 2.
(Low Temperature Characteristics)
  Temperature: The cell was stored for one hour in a thermostatic chamber maintained at −30° C.
  Charge: 5 mA/cm$^2$, 2.7 V, 60 minutes, CCCV method
  Discharge: 5 mA/cm$^2$, 0 V, 1 cycle
The capacitance measured under the above conditions is shown in Table 2 as the percentage of change in capacitance from the capacitance when discharged at 25° C.

specific surface area becomes too small, the capacitance change between the small current discharge and the large current discharge and that between −30° C. and 25° C. become large. From a comparison between Working example 3 and Comparative example 3, it can be seen that when the external specific surface area becomes too large, the capacitance change between the small current discharge and the large current discharge and that between −30° C. and 25° C. are small, but the capacitance at the 5-mA discharge and that at the 200-mA discharge become too small, which is not desirable.

From a comparison between Working example 5 and Comparative example 4, it can be seen that when the particle size distribution becomes too broad, the capacitance change between the small current discharge and the large current discharge and that between −30° C. and 25° C. become large. Further, when the distribution is broadened, the moldability and rollability of the electrode sheet tend to worsen and, in Comparative example 4, cracks occurred in the electrode sheet. As for a sample having too sharp a particle size distribution, on the other hand, such a distribution was, in itself, difficult to achieve, and it was therefore not possible to produce a comparative example.

|  | CAPACITANCE [F] | INTERNAL RESISTANCE [Ω] | TIME CONSTANT [ΩF] | CAPACITANCE AT 200 mA [F] | 200-mA/5-mA CAPACITANCE CHANGE [%] | −30° C./25° C. CAPACITANCE CHANGE [%] |
|---|---|---|---|---|---|---|
| WORKING EXAMPLE 1 | 3.55 | 0.6 | 2.1 | 2.52 | −29 | −3 |
| WORKING EXAMPLE 2 | 3.78 | 0.7 | 2.6 | 2.49 | −34 | −5 |
| WORKING EXAMPLE 3 | 3.12 | 0.5 | 1.6 | 2.28 | −27 | −3 |
| WORKING EXAMPLE 4 | 3.31 | 0.6 | 2.0 | 2.38 | −28 | −3 |
| WORKING EXAMPLE 5 | 3.79 | 0.7 | 2.7 | 2.53 | −33 | −6 |
| WORKING EXAMPLE 6 | 3.65 | 0.7 | 2.6 | 2.48 | −32 | −6 |
| WORKING EXAMPLE 7 | 3.57 | 0.6 | 2.1 | 2.28 | −36 | −8 |
| COMPARATIVE EXAMPLE 1 | 4.14 | 1.2 | 5.0 | 1.95 | −53 | −25 |
| COMPARATIVE EXAMPLE 2 | 3.92 | 0.8 | 3.1 | 2.35 | −40 | −10 |
| COMPARATIVE EXAMPLE 3 | 2.85 | 0.5 | 1.4 | 2.08 | −27 | −2 |
| COMPARATIVE EXAMPLE 4 | 3.81 | 0.9 | 3.5 | 2.29 | −40 | −10 |

As can be seen, the internal resistance and hence the time constant is smaller in the capacitors of the working examples. As the time constant becomes smaller, the charge/discharge efficiency when discharging in a short time can be increased. When Working examples 1 to 7 are compared with Comparative example 1, the capacitance at the 5-mA discharge is larger in Comparative example 1, but at the 200-mA discharge, the situation is reversed. Further, when Working example 1 is compared with Comparative example 1, the capacitance at 25° C. is larger in Comparative example 1, but at −30° C., the situation is reversed. This shows that the capacitors of the working examples are superior in large current and low temperature characteristics, and the performance change between the small current discharge and the large current discharge and that between 25° C. and −30° C. are small, which facilitates the capacitor design for applications requiring large current and low temperature characteristics.

From a comparison between Working example 2 and Comparative example 2, it can be seen that when the external A comparison between Working examples 1 and 6 shows that, though the proportion of the conductive agent was increased, the resistance increased, and the capacitance change between the small current discharge and the large current discharge and that between −30° C. and 25° C. became large. This was presumably because, as a result of the increase in the amount of the conductive agent, the interparticle interstices decreased, reducing the diffusibility of the electrolyte ions.

From a comparison between Working examples 1 and 7, it can be seen that, while the external specific surface area falls within the proper range in either case, the capacitance change between the small current discharge and the large current discharge and that between −30° C. and 25° C. are smaller in the case of the capacitor formed from natural activated carbon (coconut shell) (Working example 1) than in the case of the capacitor formed from synthetic activated carbon (phenol resin) (Working example 7). This is presumably because the numerous fine pores (especially, open-ended pores) inherently contained in the coconut shell serve to facilitate the movement of the electrolyte ions at the time of a large current discharge or in a low-temperature environment.

INDUSTRIAL APPLICABILITY

According to the present invention, an electric double layer capacitor can be achieved that is suited to large current, quick discharge applications requiring a large current such as 100 mA/cm$^2$ or larger, and/or applications in a low-temperature environment such as −20° C. or lower. Further, according to the present invention, the durability and/or safety of the electric double layer capacitor suited to such applications are enhanced. Furthermore, according to the present invention, the moldability of the polarizable electrode layers for the electric double layer capacitor suited to such applications improves.

What is claimed is:

1. An electric double layer capacitor comprising a polarizable electrode layer that contains an activated carbon, a conductive agent, and a binder, wherein an external specific surface area of said activated carbon (defined as a specific surface area calculated from a nitrogen absorption isotherm by a t-plot method by excluding micropores of pore diameter smaller than 20 angstroms), per unit volume of said polarizable electrode layer, lies within a range of 450 to 800 m$^2$/cm$^3$, and a volume based on inter-particle interstices per unit volume of said polarizable electrode layer lies within a range of 0.05 to 0.12 cm$^3$/cm$^3$.

2. An electric double layer capacitor electrode as claimed in claim 1, wherein a relative particle quantity by volume in a mode diameter of a particle size distribution in said activated carbon lies within a range of 10 to 30%.

3. An electric double layer capacitor electrode as claimed in claim 2, wherein particles contained within a range of ±30% of said mode diameter are 30 to 60% in terms of the relative particle quantity by volume.

4. An electric double layer capacitor electrode as claimed in claim 1, wherein the external specific surface area of said activated carbon lies within a range of 1000 to 2000 m$^2$/g.

5. An electric double layer capacitor electrode as claimed in claim 1, wherein said activated carbon is formed from a plant-derived natural material.

6. An electric double layer capacitor electrode as claimed in claim 5, wherein said plant-derived natural material is a coconut shell.

7. An electric double layer capacitor electrode as claimed in claim 1, wherein said conductive agent is carbon black and is added in an amount not greater than 5% by mass with respect to the total mass of said polarizable electrode layer.

8. An electric double layer capacitor electrode as claimed in claim 1, further comprising an electrolytic solution which contains polypropylene carbonate as a solvent in an amount not less than 50% by mass with respect to the mass of said electrolytic solution.

9. An electric double layer capacitor electrode as claimed in claim 1, wherein capacitance measured under large-current discharge conditions is smaller by 35% or less than the capacitance measured under small-current discharge conditions that are the same as said large-current discharge conditions except that discharge current is 5 mA/cm$^2$, said large-current discharge conditions being defined as follows:
Charge: Constant current, constant voltage method
Discharge: Constant current method
Charge current: 5 mA/cm$^2$
Discharge current: 200 mA/cm$^2$
Charge voltage: 2.7 V
Charge time: 60 minutes
Discharge voltage: 0 V
Discharge temperature: 25° C.

10. An electric double layer capacitor electrode as claimed in claim 1, wherein capacitance measured under low-temperature discharge conditions is smaller by 10% or less than the capacitance measured under normal-temperature discharge conditions that are the same as said low-temperature discharge conditions except that discharge temperature is 25° C., said low-temperature discharge conditions being defined as follows:
Charge: Constant current, constant voltage method
Discharge: Constant current method
Charge current: 5 mA/cm$^2$
Discharge current: 5 mA/cm$^2$
Charge voltage: 2.7 V
Charge time: 60 minutes
Discharge voltage: 0 V
Discharge temperature: −30° C.

* * * * *

UNITED STATES PATENT AND TRADEMARK OFFICE
CERTIFICATE OF CORRECTION

PATENT NO. : 8,848,338 B2
APPLICATION NO. : 12/438235
DATED : September 30, 2014
INVENTOR(S) : Hiroyuki Norieda and Kotaro Kobayashi It is certified that error appears in the above-identified patent and that said Letters Patent is hereby corrected as shown below:

In the Specification

At column 8, line 19: change "town" to "to an".

Signed and Sealed this
Seventeenth Day of March, 2015

Michelle K. Lee
*Director of the United States Patent and Trademark Office*